United States Patent [19]

Steinberg et al.

[11] 4,302,269
[45] Nov. 24, 1981

[54] PROCESS OF FORMING A FIBER REINFORCED, STAMPABLE THERMOPLASTIC LAMINATE

[75] Inventors: Albert H. Steinberg, Morris Plains; Lowell G. Ward, Mendham, both of N.J.

[73] Assignee: Allied Corporation, Morris Township, Morris County, N.J.

[21] Appl. No.: 83,448

[22] Filed: Oct. 10, 1979

[51] Int. Cl.³ .................... B29C 19/00; B29C 27/02
[52] U.S. Cl. ........................... 156/243; 156/244.12; 156/244.22; 156/244.27; 156/311; 156/322; 156/324; 428/252; 428/286; 428/325
[58] Field of Search .............. 156/311, 322, 244.11, 156/244.12, 244.22, 244.23, 244.24, 244.25, 244.26, 244.27, 324, 243, 500; 428/284, 286, 298, 323, 325, 327, 251-252, 395

[56] References Cited

U.S. PATENT DOCUMENTS

| | | | |
|---|---|---|---|
| 2,768,905 | 10/1956 | Massey | 156/322 X |
| 3,020,194 | 2/1962 | Jerothe | 156/322 X |
| 3,230,127 | 1/1966 | Cleereman et al. | 156/244.12 X |
| 3,627,613 | 12/1971 | Stolki | 156/322 X |
| 3,765,998 | 10/1973 | Oswald et al. | 156/244.11 X |
| 3,849,174 | 11/1974 | Ancker | 156/244.11 X |
| 3,939,025 | 2/1976 | Kane | 186/244.23 |
| 3,993,828 | 11/1976 | McCorsley | 428/251 X |
| 4,044,188 | 8/1977 | Segal | 428/284 X |
| 4,098,943 | 7/1978 | Degginger et al. | 156/324 X |
| 4,157,415 | 6/1979 | Lindenberg | 156/324 X |

*Primary Examiner*—David A. Simmons
*Attorney, Agent, or Firm*—Richard A. Negin; Ernest D. Buff

[57] ABSTRACT

Fiber reinforced thermoplastic laminate is formed by extruding first and second sheets of thermoplastic resin containing nonsiliceous fibers. A layer of nonsiliceous fibers is applied to one side of the first sheet. The second sheet is laminated to the first sheet and the layer of nonsiliceous fibers at a temperature ranging from the melting point of the thermoplastic resin to about 650° F.

15 Claims, 1 Drawing Figure

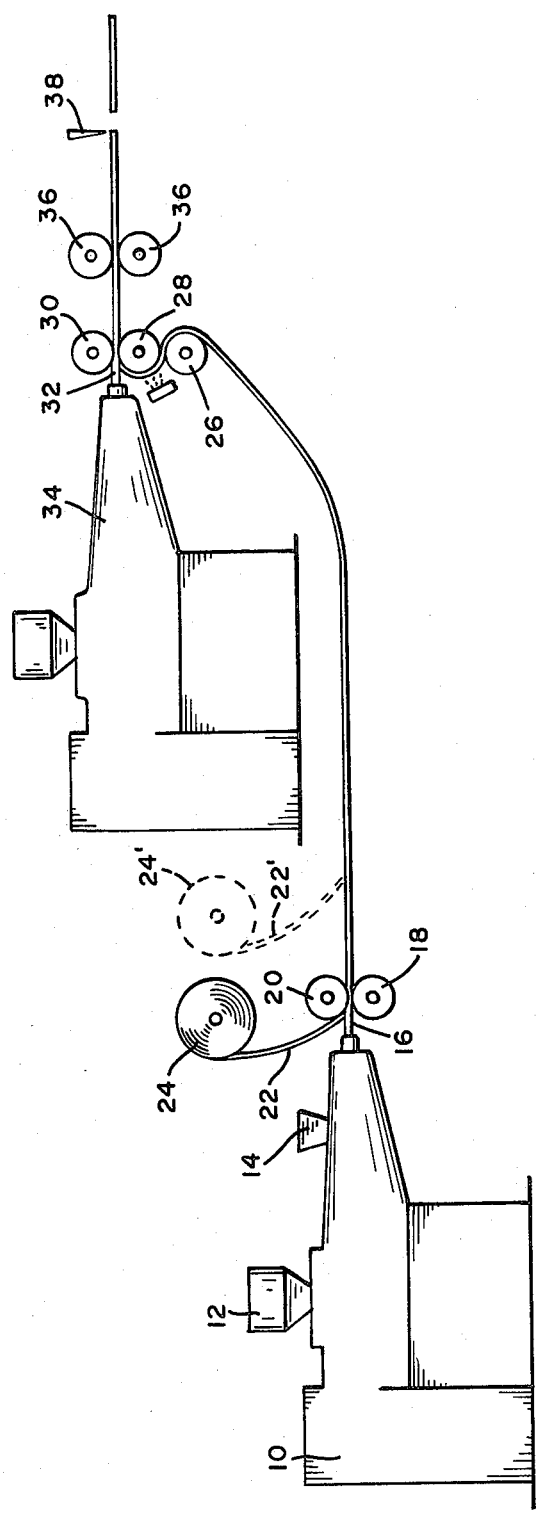

PROCESS OF FORMING A FIBER REINFORCED, STAMPABLE THERMOPLASTIC LAMINATE

DESCRIPTION

1. Field of the Invention

This invention relates to a process of forming a fiber reinforced, stampable thermoplastic laminate.

2. Description of the Prior Art

It has been proposed to form glass fiber reinforced thermoplastic laminates and shape the same by stamping or other techniques into structural or decorative parts for incorporation into automotive bodies and the like. Such laminates include a layer of thermoplastic resin, e.g., nylon 6, including a mineral filler, a layer of glass fabric which can be in the form of a nonwoven mat of fibers, a veil of such fibers or a woven fabric and a second layer of thermoplastic resin. It has previously been proposed to form such laminates by a process which includes laying up by hand the three separate lamina and compression molding at elevated temperature until a laminate is formed. Such a process has its disadvantages, such as being a basically batch process, requiring large molding equipment and providing laminates having a surface not suitable for decorative applications.

SUMMARY OF THE INVENTION

In accordance with this invention, a process of forming a fiber-reinforced, stampable thermoplastic laminate is provided, which process consists essentially of the steps of continuously extruding a first sheet of thermoplastic resin containing about 5 to 35% by weight nonsiliceous fibers on an extruded basis, continuously embedding a layer of nonsiliceous fibers into one surface of said first sheet, continuously extruding a second sheet of thermoplastic resin containing about 5 to 30% by weight of nonsiliceous fibers on an extruded basis and continuously laminating said second sheet to said first sheet and said layer of nonsiliceous fibers thereinbetween without impairing the integrity, or rearranging the fibers, of the first and second sheets, the lamination being conducted at a temperature ranging from the melting point of the thermoplastic resin to about 650° F. More specifically, the process consists essentially of the steps of continuously extruding a first sheet of nylon 6 resin containing about 10 to 35% by weight nonsiliceous fibers on an extruded basis, continuously advancing said sheet to a pair of nip rolls maintained at a temperature of about 250° to 350° F., continuously feeding the layer of nonsiliceous fibers to said nip, continuously embedding said layer of fibers into one surface of said first sheet to form a prelaminate, continuously advancing said prelaminate to a lamination zone comprising a set of adjacent rollers forming a nip, continuously extruding said second sheet and advancing the same between the nip of said rolls, and continuously laminating said second sheet to said first sheet and said layer of nonsiliceous fibers without impairing the integrity, or rearranging the fibers, of the first and second sheets, the lamination being conducted at a temperature in the range of about 450° to 550° F.

BRIEF DESCRIPTION OF THE DRAWINGS

The sole FIGURE is a schematic view of the process of the invention.

DESCRIPTION OF THE PREFERRED EMBODIMENTS

The process of this invention is particularly amenable for forming laminates of thermoplastic sheets comprising nylon 6 resin (the polymerization product of $\epsilon$-aminocaproic acid or caprolactam), nonsiliceous fiber and mineral fillers and a centrally disposed layer of nonsiliceous fiber impregnated by the resinous matrix. A first of the sheets contains a minimum of about 5% by weight based on the total weight of the extruded sheet of nonsiliceous fiber. A second of the sheets contains a minimum of about 5% by weight based on the total weight of the extruded sheet of nonsiliceous fiber. The presence of nonsiliceous fiber reduces sagging of the sheet while it is being transported in this process, reduces feeding problems in the extruder caused by aggregation of mineral filler in the mix and also acts as a reinforcing agent. Preferably, the nonsiliceous fiber is present in a first of the sheets in an amount of about 20 to 30 weight percent, and in a second of the sheets in an amount of about 15 to 25 weight percent. Above the maximum amounts, extrusion and lamination of the sheet becomes increasingly difficult to accomplish. The nonsiliceous fiber may be of any suitable length, ranging from chopped fiber of 1/16 inch or less to continuous filaments since the fiber length is reduced in the extruder. The nonsiliceous fiber is preferably in the form of fiber strands comprised of about 2 to 400, preferably 5 to 120, filaments per strand. Each filament is about 0.00030 to about 0.001 inch, preferably 0.00035 to 0.00085 inch, in diameter. The nonsiliceous fibers may optionally be treated with various coupling agents or adhesion promoters as is known in the art.

Each of the sheets can include a particulate mineral filler which reduces cost and improves the flexural and tensile modulus of the sheets and is present in an amount of about 5 to 35% by weight of the extruded sheet, preferably 15 to 30% and more preferably 20 to 25%. As mineral fillers, there can be employed those fillers that are suitable for incorporation into plastic materials, such as minerals, metals, metallic oxides, metallic salts, siliceous materials and the like and mixtures thereof. Exemplary of such fillers are clays such as kaolin and bentonite, novaculite and other forms of silica, glass beads, talc, feldspar, alumina, aluminum hydrates, calcium carbonate, quartz, garnet, mica, calcium oxide, calcium hydroxide, gypsum, wollastonite, and the like. These fillers may optionally be treated with various coupling agents or adhesion promoters as is known in the art. The preferred fillers include kaolin and glass beads.

With sheets formed of nylon 6 resin, it is preferred to utilize talc as a nucleating agent for the nylon. For this purpose about 0.5 to 1.5% or more talc by weight of the nylon is incorporated into the sheet. Preferably, the sheet contains about 1% talc based on the weight of the nylon. Other nucleating agents may alternatively be employed in similar amounts with nylon or other crystalline polymers.

The thermoplastic sheet can be extruded utilizing any conventional screw extruder apparatus. It is preferred, however, to employ a vented extruder 10 in order to remove volatiles that are released by the components in the extruder. The extruder 10 includes a conventional feed hopper 12 to which the components of the the sheet are added. If desired, the components of the sheet may be added in pelletized form.

Preferably, the components are thoroughly blended together prior to being fed into the extruder. For this purpose, conventional mixing apparatus can be employed. Good results have been obtained utilizing a tumbling-type mixer. It is desirable to first blend the nylon 6 resin, which may be in pellet or powder form, with the mineral filler and talc if employed as well as any colorants or pigments or other conventional additives, continue mixing, thereafter add the nonsiliceous fibers and continue mixing for an additional time. The mineral filler and talc, as well as pigments, etc. are preferably blended in particulate form. Mixing may be performed at any suitable temperature but it is preferred to dry mix the components at about room temperature.

As an example of a typical mixing operation for a nylon 6 composition, nylon pellets, mineral filler and talc are blended for about 5 to 10 minutes, the nonsiliceous fibers added and blending continued for about an additional 1 to 3 minutes. Mixing times greater than 3 minutes in the final mixing step tend to agglomerate the fibers and hence should be avoided.

The blended composition is fed to the feed throat of a conventional extruder, such as a single or double barrel extruder, and the composition is extruded at a temperature above the melting point of the thermoplastic resin, that is, above about 425° F. and preferably in the range of about 450°–550° F. for nylon 6. The composition is extruded through the die head of the extruder in the form of a relatively thick sheet typically between about 50 and 300 mils thick. The sheet is passed between a pair of nip rolls 18, 20, which rotate at a faster surface rate of speed than the rate the sheet is extruded from the die. As a result, a sheet of the extruded composite is formed which has a reduced thickness in comparison with the thickness of the extrudate. Typically, the sheet may be of a thickness in the range of about 30 to 200 mils, preferably 40 to 120 mils. The "draw down ratio," that is, the ratio between the speed of the nip rolls and the speed of the die of the extrudate fed thereto, should be in the range of about 1.5:1 to 3:1. Draw down ratios below about 1.5:1 tend to produce sheets of uneven flatness whereas ratios above about 3:1 can cause the sheet to tear.

The nip rolls are maintained at a surface temperature in the range of about up to about 350° F., preferably about 200° to 350° F. At temperatures above about 350° F. the nylon melt tends to adhere to the nip rolls, destroying the integrity of the sheet. The nip rolls are typically adjusted to exert a pressure of about 75 to 200 pounds per inch of sheet width, preferably about 100 to 150 pounds per inch of sheet width, in order to effectuate impregnation.

A layer 22 of nonsiliceous fiber is laid upon one surface of the sheet prior to or concurrently with entrance of the sheet into the nip. The purpose of the layer of nonsiliceous fibers is to provide rigidity and strength to the final product, and to facilitate handling of the composite laminate in the processing steps, particularly the steps of heating and transfer to the stamping press. This layer may be in the form of a woven or nonwoven mat having continuous or finite lengths of nonsiliceous fibers (i.e., strands or filaments) with or without sizing agents, coupling agents and/or binders. The mat is a porous, lightweight material and typically has a thickness of between about 10 and 150 mils and a weight of about 0.1 to 5 ounces per square foot. The major contribution of nonsiliceous fiber mats 0.1 to 0.25 ounces per square foot in weight and 10 to 70 mils thick, oftentimes referred to as surface veils, is in preventing sagging of the composite sheet during handling prior to and during the stamping operation. The nonsiliceous fibers employed in the mat or veil are of a diameter in the range referred to previously with respect to the nonsiliceous fiber of the sheet. The mat or veil is supplied in sheet form and may be wound in a roll 24 or provided in other configurations.

When the mat or veil is laid upon the sheet prior to or at the nip rolls, the mat or veil is bonded to and partially penetrates into one surface of the hot sheet. When the mat or veil 22 is alternatively laid upon the sheet after the latter has passed through the nip rolls 18, 20, for example by means of roll 24', it may merely be supported by the underlying sheet or it too may be penetrated into the sheet surface by means of a pressure roll coupled with a heat source capable of melting the sheet surfaces. The mat or veil 22, 22' shown schematically in FIG. 1 can be comprised of a plurality of mats or veils. Further, the mat or veil 22' can be laid upon a sheet to which a mat or veil 22 has been bonded.

The sheet with its overlying layer of nonsiliceous fibers, herein referred to as "prelaminate," is advanced to a lamination zone where the second sheet of thermoplastic resin is applied over the layer of nonsiliceous fibers and is bonded to the underlying layers. The temperature of the prelaminate advancing to the lamination zone is typically above room temperature and preferably above about 250° F. In order to maintain the temperature, there may be optionally employed an enclosed tunnel or the like through which the prelaminate advances or a series of heaters, such as infrared heaters, may be employed. Alternatively or in addition thereto, an optional heater, such as an infrared heater, may be positioned in the lamination zone.

The lamination zone comprises a plurality of heated rolls. Preferably, three such rolls are employed, arranged vertically in a set. The lower two rolls are maintained at a temperature below the melting point of the thermoplastic resin. The purpose of the first roll 26 is to reheat or maintain the temperature of the prelaminate. In use of nylon 6 resin, for example, the first roll should be maintained at a surface temperature in the range of about 250° to 420° F., preferably in the range of about 300° to 375° F. The first roll as well as the additional roll(s) may be heated by any conventional means, such as by circulating hot oil through the interior of the roll. In order to insure good heating of the prelaminate, it is preferably passed beneath and around the first roll so that it is in contact with the roll for approximately 120 to 225 degrees of roll circumference.

The prelaminate leaving the first roll contacts a second heated roll 28. The surface of the second roll 28 is maintained in the same range of temperatures as is that of nip rolls 18, 20. The prelaminate preferably contacts the second roll 28 for approximately 180 degrees of circumference and the prelaminate is positioned so that the layer of nonsiliceous fibers faces away from the surface of the roll 28. This arrangement also permits such exposed surface of the prelaminate to be heated by means of an optional infrared or other type heater to a lamination temperature in the range of about 450°–550° F.

The prelaminate is thereafter passed between the second and third rolls 28 and 30 where a second sheet 32 of thermoplastic material is laminated thereto. This second sheet also preferably is formed of a nylon 6 composition, including nonsiliceous fibers, mineral filler and nucleating aid in the amounts discussed with respect to the first sheet. The composition of the second sheet may be identical to or different than that of the first sheet. The second sheet is also formed by an extrusion process and for this purpose there may be utilized an extrusion apparatus 34 of the same type described with respect to the first sheet. Similar extrusion temperatures may be employed. The die head of the second extruder typically is spaced as close to the nip formed by the second and third rolls as is possible while maintaining clearance between the peripheral surfaces of the rolls and the die head. A typical spacing of the die head from this nip of the second and third rolls is in the order of about 1 to 4 inches. The second extruder provides a hot extrudate typically of a thickness of about 50 to 300 mils. This extrudate is fed to the nip formed by the second and third rolls and is positioned so as to contact the surface of the prelaminate bearing the layer of nonsiliceous fibers. Initial contact between the second sheet and the prelaminate may be made slightly before or in the nip.

As mentioned before, in the nip the second sheet is laminated to the prelaminate. The third roll is maintained at a surface temperature below about 350° F., preferably in the range of about 250° to 325° F. so that lamination is effectuated without undue loss of sheet temperature. The second and third rolls are positioned so that a pressure in the range of about 75 to 200 psi, preferably 100 to 150 psi is exerted therebetween. The second and third rolls are rotated at a faster surface speed than the second sheet is fed to the nip, so that the second sheet is "sheeted out" as well as laminated in the nip. For example, the second and third rolls may be rotated at a surface speed of 2 to 25 feet per minute and the second sheet extruded at a linear speed of 0.7 to 17 feet. The first, second, and third rolls are rotated at substantially the same surface speed.

The material passing out of the nip is in the form of a composite laminated sheet formed of two layers of nylon 6 or other thermoplastic and a nonsiliceous fiber layer embedded therein. The intermediate nonsiliceous fiber layer is desirably positioned at approximately the center of the laminate although it may be positioned closer to one surface of the laminate if so desired by forming the two sheets of different thicknesses. When laminated together, the two sheets form a matrix encasing the layer of nonsiliceous fiber. Short fibers contained by the resin are randomly but predominately two-dimensionally oriented in the plane of the sheet. The lamination does not substantially impair the integrity of or substantially rearrange the short fibers, with the result that more than 50% of the short fibers are aligned substantially parallel to the plane of the sheet. Such orientation of the short nonsiliceous fibers is preferable for increasing sheet strength and achieving smooth-surface sheets. The composite sheet is thereafter advanced by a pair of pulling rolls 36 or the like which are rotated at a speed to provide a slight overall tension in the laminate. For example, the pulling rolls can be operated at a speed in the order of about 0.05 to 1% higher than the surface speed of the rolls of the preceding nip.

The composite sheets are thereafter cut by shear 38 or otherwise formed into blanks of desired size. Any conventional cutting arrangement may be employed, desirably one that travels with the moving laminate. If desired, the composite sheet may be cooled by air cooling or the like, prior to cutting.

The resultant laminate can be compression molded, stamped or otherwise shaped by application of heat and pressure. The composite sheet may be formed by a cold or hot stamping operation, that is, at sheet temperatures below or above the melting point. It has been found that cold or hot forming in metal stamping equipment provides acceptable stamped parts. Exemplary of the parts which can be stamped from the composite sheets are automotive decorative and/or structural parts such as deck lids, fender extenders, oil pans, bumpers, headlight housings and the like.

The composite sheet can be stamped in line before or after the cutting step. It may be cooled or allowed to cool prior to stamping and packaging.

The process of the present invention can be practiced using a wide variety of nonsiliceous fibers, such as nonsiliceous fibers composed of inorganic materials or organic materials having a melting point higher than that of the thermoplastic resin. Typical nonsiliceous fibers suitable for use in the process of this invention include fibers composed of asbestos, carbon, graphite, boron, cellulose, alumina, metal, mixtures thereof and the like.

Further, it is within the ambit of the present invention to combine siliceous fiber with said nonsiliceous fibers and nonsiliceous fiber mixtures. Typically, such amounts of siliceous fiber range up to about 90%, and preferably from about 50 to 80% by weight of the combined fiber mixture. Siliceous fibers suitable for use in the present invention include glass and quartz fiber and mixtures thereof. Still further, such siliceous fibers can be used to form a portion of at least one of a plurality of mats comprising the nonsiliceous fiber layers as in the order of up to about 100% and preferably about 50 to 80% by weight thereof.

The following examples are presented to provide a more complete understanding of the invention. The specific techniques, conditions, materials, proportions and reported data set forth to illustrate the principles and practice of the invention are exemplary and should not be construed as limiting the scope of the invention.

EXAMPLE 1

A blend of 60% nylon, 30% short graphite fibers and 10% mineral filler is fed to the hopper of single screw extruder 10. A blend of this composition is fed to the hopper of single screw extruder 34.

Each of the extruders 10, 34, is operated to produce a flat sheet measuring 0.150 inch at the lips of the sheet die. Extruder barrel temperatures range from 450°–480° F. at the first heating zone upward to 540°–560° F. at the exit zone. Die temperatures range from 520° to 550° F.

The extruded sheets are fed individually to calenders operating at surface speeds suitable to reduce the sheet thickness to ⅓ of that at the die lips. To the first of these two sheets is plied a single layer of light graphite mat weighing approximately 3.3 g/square foot. Calender roll temperatures are maintained at 230°–250° F.

A second layer of mat is deposited onto the surface of the first sheet to which the first mat is plied. The second of the sheets is extruded onto the mat from a die head located close to the nip of a pair of calender rolls 28, 30. The combined sheets and mats are fed into the nip and pressed by the squeezing action of the nip into a cohesive laminate. Calender roll temperatures used to laminate the combined sheets and mats range from about 250°–290° F. The resulting sheet is cut into discrete blanks, stored for several days and then stamped into automobile headlight covers.

EXAMPLE 2

A blend of 50% nylon, 30% short boron fibers and 20% mineral filler is fed to the hopper of single screw extruder 10. A blend of this composition is fed to the hopper of single screw extruder 34.

Each of the extruders 10, 34, is operated to produce a flat sheet measuring 0.150 inch at the lips of the sheet die. Extruder barrel temperatures range from 470°–475° F. at the first heating zone upward to 525°–530° F. at the exit zone. Die temperatures range from 518°–535° F.

The extruded sheets are fed individually to calenders operating at surface speeds suitable to reduce the sheet thickness to approximately ⅓ of that at the die lips. To the first of these two sheets is plied a single layer of mat composed of boron fibers and weighing approximately 1 oz/square foot. Calender roll temperatures are maintained at 230°–250° F.

A second layer of mat is deposited onto the surface of the first sheet to which the mat is plied. The second of the sheets is extruded onto the mat from a die head located close to the nip of a pair of calender rolls 28, 30. The combined sheets and mats are fed into the nip and pressed by the squeezing action of the nip into a cohesive laminate. The temperature of calender rolls 28, 30, is in the range of 250°–290° F. The resulting sheet is cut into discrete blanks, stored for several days and then stamped into retaining panels for automobile tail lights.

Although the above discussion has been directed primarily to nylon 6, it is to be understood that other thermoplastic polymers may be employed in the process of this invention. Such thermoplastic polymers include other polyamides, that is, polymers having regularly occurring amide groups as an integral part of their main polymer chain, such as nylon 6,6; linear polyester resins such as polyethylene terephthalate and polybutylene terephthalate; polyolefins such as polyethylene, polypropylene and polymethylpentene; polyurethanes; polysulfones; polycarbonates; cellulose ester resins such as cellulose nitrate, cellulose acetate and cellulose propionate; halogenated olefins and polyacetal resins and the like. Copolymers and/or blends of two or more of the polymeric materials may also be employed.

Having thus described the invention in rather full detail, it will be apparent that these details need not be strictly adhered to, but that various changes and modifications may suggest themselves to one skilled in the art, all falling within the scope of the invention as defined by the subjoined claims.

We claim:

1. A continuous process of forming a nonsiliceous fiber reinforced, stampable thermoplastic laminate consisting essentially of:
    (a) extruding a first sheet of thermoplastic resin containing about 5 to 35% by weight nonsiliceous fibers on an extruded basis;
    (b) embedding a layer of nonsiliceous fibers into one side of said first sheet;
    (c) extruding a second sheet of thermoplastic resin containing about 5 to 35% by weight of nonsiliceous fibers on an extruded basis; and
    (d) laminating, in a lamination zone, said second sheet to said first sheet and said layer of nonsiliceous fibers without substantially impairing the integrity of or rearranging said nonsiliceous fibers of said first and second sheets, wherein said lamination zone comprises a set of three heated rolls, said first sheet and said layer of nonsiliceous fibers being in the form of a prelaminate and being passed serially around the first and second of said heated rolls and then between the second and third rolls, advancing said second sheet to the nip formed by the second and third rolls and onto said prelaminate and laminating said prelaminate and said second sheet between said second and third rolls, the lamination being conducted at a temperature ranging from the melting point of the resin to about 650° F.

2. The process of claim 1 wherein said first sheet further comprises a particulate mineral filler.

3. The process of claim 2 wherein said second sheet further comprises a particulate mineral filler.

4. The process of claim 3 wherein said thermoplastic resin is nylon 6 resin, said first sheet comprises, by weight basis of the extruded sheet, 20 to 30% nonsiliceous fiber, 5 to 35% mineral filler and 0.5 to 1.5% talc as a nucleating agent and said laminating step is conducted at a temperature in the range of about 450° to 550° F.

5. The process of claim 4 wherein said mineral filler comprises glass beads.

6. The process of claim 1 wherein said thermoplastic resin is nylon 6 and said second and third rolls are maintained at a maximum surface temperature of about 350° F.

7. The process of claim 6 wherein said first roll is maintained at a surface temperature below the melting point of said resin.

8. The process of claim 1 wherein said prelaminate is additionally heated during contact with said first and second rolls by means of an infrared heater before reaching said nip of said second and third rolls.

9. The process of claim 3 wherein each of said first and second sheets contains 0.1 to 1.0% by weight of a coupling aid.

10. The process of claim 1, wherein said nonsiliceous fibers of said first and second sheets are selected from the group consisting of nylon, polyester, carbon, graphite, boron, cellulose and mixtures thereof.

11. The process of claim 1, wherein said layer of nonsiliceous fibers is composed of fibers from the group consisting of nylon, polyester, carbon, graphite, boron, cellulose and mixtures thereof.

12. The process of claim 1 wherein each of said first and second sheets has a fiber content 50–80% by weight of which is siliceous.

13. The process of claim 1, wherein said layer of nonsiliceous fibers is comprised of a plurality of mats, at least one of which contains about 50–80% by weight siliceous fiber.

14. A continuous process of forming a nonsiliceous fiber reinforced, stampable nylon 6 laminate consisting essentially of the steps of:
    (a) extruding a first sheet of nylon 6 resin containing by weight on an extruded basis about 5 to 35% nonsiliceous fibers, 5 to 35% mineral filler and 0.5 to 1.5% talc as a nucleating agent;
    (b) embedding a layer of nonsiliceous fibers into one side of said first sheet;
    (c) extruding a second sheet of thermoplastic resin containing about 5 to 35% by weight of nonsiliceous fibers on an extruded basis, and further comprising a particulate mineral filler;
    (d) laminating said second sheet to said first sheet and said layer of nonsiliceous fibers without substantially impairing the integrity of or rearranging said nonsiliceous fibers of said first and second sheets, the lamination being conducted in a temperature range of from about 450° F. to 550° F.

15. The process of claim 14 wherein said mineral filler comprises glass beads.

* * * * *